United States Patent [19]

Haubennestel et al.

[11] Patent Number: 4,812,518
[45] Date of Patent: * Mar. 14, 1989

[54] POLYESTER GROUP CONTAINING POLYSILOXANES FOR LACQUERS AND MOLDING COMPOSITIONS

[75] Inventors: Karlheinz Haubennestel, Wesel; Alfred Bubat, Wesel-Bislich, both of Fed. Rep. of Germany

[73] Assignee: BYK-Chemie GmbH, Wesel, Fed. Rep. of Germany

[*] Notice: The portion of the term of this patent subsequent to Sep. 23, 2003 has been disclaimed.

[21] Appl. No.: 913,302

[22] Filed: Sep. 30, 1986

[30] Foreign Application Priority Data

Oct. 3, 1985 [DE] Fed. Rep. of Germany ....... 3535283

[51] Int. Cl.⁴ .......................... C08F 8/00; C08G 77/04
[52] U.S. Cl. ..................... 525/100; 525/101; 525/446; 525/474; 528/26
[58] Field of Search ............... 525/443, 446, 100, 101, 525/474; 520/26

[56] References Cited

U.S. PATENT DOCUMENTS

| | | | |
|---|---|---|---|
| 4,613,641 | 9/1986 | Haubennestal et al. | 528/26 |
| 4,636,552 | 1/1987 | Gay et al. | 525/63 |
| 4,663,413 | 5/1987 | Ward et al. | 528/26 |

Primary Examiner—John C. Bleutge
Assistant Examiner—Ralph Dean, Jr.

Attorney, Agent, or Firm—Foley & Lardner, Schwartz, Jeffery, Schwaab, Mack, Blumenthal & Evans

[57] ABSTRACT

Lacquers and molding compositions containing an anti-adhesive character producing and lubricity increasing amount of a polyester-containing polysiloxane corresponding to the formula

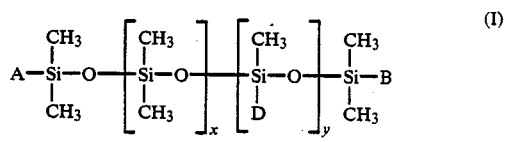

wherein A, B and D each represent —CH$_3$ or —Z—R—Q; Z represents an alkylene group with 1 to 11 carbon atoms, —(CH$_2$)$_2$SCH$_2$— or —(CH$_2$)$_3$NHCO—; R represents an aliphatic, cycloaliphatic or aromatic group containing at least 3 carboxylate ester groups and having an average molecular weight $\overline{M}_n$ of 300 to 3,000; Q represents a reactive group capable of chemically reacting with a resin component of the lacquer or molding composition; x represents a number from 4 to 150; y represents a number from 1 to 6, in which an average molecule contains at least one group —Z—R—Q and the ratio of the number of —Z—R—Q groups to the number x is from 1:3 to 1:30. A process for imparting anti-adhesive character and increasing lubricity of lacquers and molding compositions by incorporating such polyester-containing polysiloxanes into the compositions as additives is also disclosed.

22 Claims, No Drawings

POLYESTER GROUP CONTAINING POLYSILOXANES FOR LACQUERS AND MOLDING COMPOSITIONS

BACKGROUND OF THE INVENTION

The present invention relates to coating compositions or lacquers and to molding compositions with a polysiloxane content which produces anti-adhesive characteristics and which increases the lubricity. Further, the invention relates to the use of certain defined polysiloxanes as described hereinafter to produce anti-adhesive characteristics in lacquers and molding compositions.

It is known to add polysiloxanes to coating compositions or lacquers in order to obtain a soil-resistant surface by means of the resulting boundary layer. Additionally, the scratch resistance and lubricity of the surfaces are improved by such polysiloxane additions.

Polysiloxanes are also added to molding compositions in order to facilitate release of formed articles from the molds following a molding process involving a chemical cross-linking reaction under the influence of elevated temperatures.

The aforementioned characteristic of forming antiadhesive surface layers is of particular interest with regard to surfaces which might be expected to be soiled or defaced, for example, in cases of vandalism where grafitti is applied to the facades of buildings by spraying spray paint on them. Facades which are protected with anti-adhesive products can be easily cleaned again.

By using a polysiloxane in paints or lacquers, furniture surfaces are also made more scratch resistant, so that the visible results of abrasions which occur during daily use, such as scratches and markings, can be clearly reduced.

Polysiloxane modified binders are also used in coating papers which exhibit the known anti-adhesive action of so-called release papers.

For the aforedescribed purposes, polysiloxanes from the classes of dimethylpolysiloxanes, methylphenylsiloxanes, polyalkylene-modified dimethylpolysiloxanes, reactive polydimethylpolysiloxanes, and hydroxyfunctional polyethersiloxanes are used. The use of these products is described in West German Pat. Nos. 11 11 320 and 10 92 585, published European Patent Application Nos. 116,966 and 103,367, U.S. Pat. No. 4,076,695, and in Proceedings of the SPI, 6th International Technical Conference—Improved RIM-Processing with Silicone Internal Mold Release Technology, as well as in the brochure "Goldschmidt Informiert" (Goldsmith Informs), July 1982, No. 56, page 2, and in Fatipec Congress Book, 1963, page 332.

A surface activity is ascribed to each of these aforementioned polysiloxanes which manifests itself in an enrichment of these polysiloxanes occurring at the liquid/gas or solid/gas boundary surface so that the desired characteristics are produced, i.e. a reduction of adhesion and an increase in lubricity.

Silicon-modified binders constitute a separate class of coating compositions which cannot be compared to the aforedescribed polysiloxanes since in silicon-modified binders the polysiloxane groups are fixedly incorporated into the binder by polyaddition and polycondensation. These silicon resins substantially fulfill the requirements placed on them for anti-adhesive characteristics, but because of the high Si-content, they are very expensive, and therefore they can only be used to a limited extent.

With the exception of reactive polysiloxanes, these polysiloxane structures are inert substances with regard to their reactivity with the lacquers and molding compositions. The results achieved with them in reducing the adhesion or increasing the lubricity are consequently not of long enduring effectiveness, for because of the surface orientation, these polysiloxanes can be easily wiped away or washed away with solvents, whereby the effect is lost.

Polysiloxanes which carry reactive functional groups are, because of their incompatibility, very difficult to incorporate into lacquers or molding compositions, since they tend to separate and are not homogeneously distributed throughout the reaction system during the reaction of the lacquer binder resin or molding composition resin with itself and are only partially incorporated into the product. Attempts have been made to avoid this by incorporating such reactive polysiloxanes into the reactive resin during its production. However, the mobility of the polysiloxanes is adversely affected thereby, and orientation toward the surface is substantially prevented, so that relatively large amounts of polysiloxane must be utilized in order to achieve the desired anti-adhesive effect.

Use of carboxy-functional siloxanes according to U.S. Pat. No. 4,076,695 in polyurethane systems delays the urethane-forming reaction so that a sufficiently rapid reaction is not achieved without a drastic increase in the catalyst proportion or a modification of the processing procedure. Because of the incompatibility of polysiloxanes of the types described in U.S. Pat. No. 4,076,695, published European Patent Application No. 103,367 and published European Patent Application No. 116,966, disruptions of the cell structure may arise during foaming, particularly in polyurethane foams, which leads to irregularities in structure.

Polyether-modified polysiloxanes have only limited temperature stability when subjected to the influence of oxygen because of the polyether structure, so that a breakdown of the polyether chain arises at temperatures above 150° C. which leads to disturbances in the lacquer resin or the molding composition.

SUMMARY OF THE INVENTION

It is the object of the present invention to provide polysiloxanes for conferring anti-adhesive properties on and increasing the lubricity of coating compositions such as paints or lacquers and molding compositions which substantially or entirely avoid the aforementioned negative characteristics.

A particular object of the invention is to provide a polysiloxane which can provide an anti-adhesive and lubricity increasing effect having a long duration.

It is also an object of the present invention to provide a polysiloxane which can provide an anti-adhesive character and an improvement in lubricity of lacquers or molding compositions without requiring a large quantity of the polysiloxane component to be incorporated into the lacquer or molding composition.

A further object of the invention is to provide a polysiloxane which can be individually or separately incorporated into lacquers or molding compositions.

Yet another object of the invention is to provide a polysiloxane which can impart an anti-adhesive character and improve the lubricity of lacquers or molding compositions in an economical manner.

It is also an object of the present invention to provide a polysiloxane which can impart anti-adhesive character and improve the lubricity of lacquers or molding compositions in an ecologically advantageous manner.

Yet another object of the invention is to provide a method of imparting anti-adhesive character to and improving the lubricity of lacquers or molding compositions.

These and other objects of the invention are achieved by providing a lacquer or molding composition comprising an effective anti-adhesive characteristic producing and lubricity increasing amount of a polyestercontaining polysiloxane corresponding to the following average formula

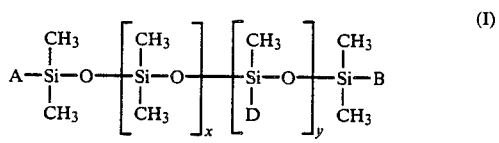
(I)

wherein A, B and D each represent —CH$_3$ or a group —Z—R—Q in which Z represents an alkylene group having from 1 to 11 carbon atoms, —(CH$_2$)$_2$SCH$_2$— or —(CH$_2$)$_3$NHCO—; R represents an aliphatic, cycloaliphatic or aromatic group containing at least 3 carboxylate ester linkages and having an average molecular weight $\overline{Mn}$ of from 300 to 3,000 and Q represents a reactive group capable of reacting chemically with a resin component of the lacquer or molding composition; x is a number from 4 to 150, and y is a number from 1 to 6, and wherein an average molecule contains at least 1 group —Z—R—Q, and the ratio of the number of groups —Z—R—Q to the number x is from 1:3 to 1:30.

In another aspect of the invention, the objects are achieved by providing a method of imparting anti-adhesive character and improving the lubricity of a composition selected from the group consisting of coating compositions and molding compositions comprising incorporating into the composition an effective anti-adhesive character imparting and lubricity increasing amount of a polyester-containing polysiloxane corresponding to the average formula

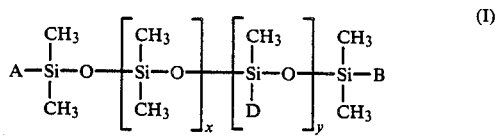
(I)

wherein A, B and D each represent —CH$_3$ or a group —Z—R—Q, in which Z represents an alkylene group having from 1 to 11 carbon atoms, —(CH$_2$)$_2$SCH$_2$— or —(CH$_2$)$_3$NHCO—; R represents an aliphatic, cycloaliphatic or aromatic group containing at least 3 carboxylate ester linkages and having an average molecular weight $\overline{Mn}$ of from 300 to 3,000 and Q represents a reactive group capable of reacting chemically with a resin component of the lacquer or molding composition; x is a number from 4 to 150; y is a number from 1 to 6, and wherein an average molecule contains at least 1 group —Z—R—Q, and the ratio of the number of groups —Z—R—Q to the number x is from 1:3 to 1:30.

DETAILED DESCRIPTION OF PREFERRED EMBODIMENTS

The invention therefore relates to coating compositions, i.e. lacquers, paints and the like, and molding compositions containing an amount of a polysiloxane which produces anti-adhesive character and/or increases the lubricity of the composition in which the polysiloxane is a polyester group containing polysiloxane corresponding to the following average formula:

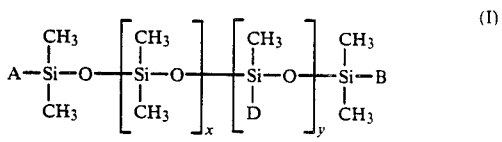
(I)

wherein

A, B and D each independently represent —CH$_3$ or a group —Z—R—Q, whereby the average molecule contains at least one group —Z—R—Q;

Z represents an alkylene group having from 1 to 11 C-atoms, —(CH$_2$)$_2$SCH$_2$— or —(CH$_2$)$_3$NHCO—;

R represents an aliphatic and/or cycloaliphatic and/or aromatic group containing at least three carboxylic acid ester groups and having an average molecular weight $\overline{Mn}$ from 300 to 3000;

Q represents a group which is reactive with the lacquer binder or molding resin;

x is an integer from 4 to 150, and y is an integer from 1 to 6;

whereby the average molecule contains at least one group —Z—R—Q, and the ratio of the number of groups —Z—R—Q to the number x is from 1:3 to 1:30.

As used herein, the term "lacquers" is intended to refer to coating compositions which are applied as a liquid to a substrate and through forming of a film produce a protective or functional and/or decorative surface. Substrates to which lacquers containing polysiloxanes according to the invention may be applied include, for example, wood, metal, synthetic plastic films or webs, synthetic plastic parts, paper, leather, and construction materials, such as for example, masonry, concrete and plaster. The invention may relate to unpigmented, pigmented and/or dye-containing lacquers, which in turn may contain various types of binders. Coatings within the scope of the invention include those containing magnetic pigments as used in the production of data carriers, for example Fe$_2$O$_3$ and CrO$_2$. It is also intended to include within the scope of the invention compositions for forming permanent lubricating coatings.

The reactive groups of the polysiloxane of the invention should be matched to the crosslinking or hardening mechanism of the involved lacquer system or molding composition, i.e. the binder which every lacquer or every molding composition contains. Examples of mechanisms which progress in different ways include the polyaddition mechanism in, for example, acrylate/isocyanate lacquers (PUR-lacquers) and epoxy resins, and the polycondensation mechanism in, for example, acrylate/aminoplast resin lacquers, alkyd-/aminoplast resin lacquers, saturated polyester resin lacquers and modified aminoplast resin lacquers such as melamine resin lacquers and urea resin lacquers, and the polymerization mechanism in lacquer systems which are curable by radical polymerization initiated by high energy radiation or peroxides, for example UV-radiation or electron radiation, or unsaturated polyester resin lacquers.

These lacquers may contain organic solvents and/or water as the liquid phase, as is known to persons skilled in the art. The liquid phase may also be present in the form of monomers or low molecular weight compounds which react with other binder components to form the lacquer coating.

The lacquers of the invention may also be so-called powder lacquers which do not contain any liquid phase and are applied in the form of powders to the substrate which is to be coated and are caused to react on the substrate. Powder lacquers are often utilized in so-called electrostatic coating processes. See Feldmann, "Korrosionsschutz durch Kunststoffpulver" (Corrosion Protection by Synthetic Resin Powder), *Chemieanlagen und Verfahren* (Chemical Plants and Processes), October 1984, pages 87-94.

The lacquers of the invention thus have fundamentally the same base composition as known lacquers which can contain siloxanes as additives. They may also contain otherwise conventional lacquer additives, such as cross-linking agents, dispersing agents, fillers, catalysts and/or accelerators for curing, materials which affect the rheological properties of the lacquer, etc.

In a similar sense, the same applies to molding compositions as has been stated above with regard to lacquers. The term "molding compositions" is intended to refer to masses which are processed to produce shaped bodies, whereby a reactive resin contained in the mass is caused to react during the forming process, as a rule at elevated temperature. Molding compositions in the sense of the invention include, for example, those based on unsaturated polyester resins and vinyl resins, also in combination with thermoplastic materials such as polystyrene, polyvinylacetate, polymethylmethacrylate and styrene-butadiene copolymers which may be added as shrinkage-reducing components to the polyester resins. Further molding compositions include, in particular, polyurethanes and polyamides, which are utilized, for example, in the reaction injection molding process (RIM) and which present particular difficulties with regard to releasability from the molds.

Other molding compositions may be made based on epoxy resins. These epoxy resins are preferably utilized in the field of casting compositions and press compositions. Further molding compositions, which can be processed, for example, by the wet pressing process, injection process or profile drawing process, include phenol-formaldehyde condensation resins, which are also generally referred to as phenolic resins.

The molding compositions may likewise generally contain conventional additives or other components in accordance with the state of the art as have already been enumerated above with respect to lacquers. In particular, the molding compositions may contain fillers and/or reinforcing fillers, such as, for example, glass fibers, carbon fiber, polyamide fibers, wolastonite, silicates, inorganic carbonates, aluminum hydroxide, barium sulfate and kaolin.

The polysiloxanes according to the invention show especially advantageous effects in heat-hardenable lacquers, since the polysiloxanes used according to the invention are very temperature stable, for example at temperatures up to 250° C., and at relatively brief reaction times even at temperatures up to about 350° C., as are generally conventionally encountered in coil coating plants. In such circumstances hydroxy-terminated polyethersiloxanes cannot be used since polyoxyalkylene groups thermally decompose under these conditions.

According to the invention it has been found to be especially advantageous that the group R, which represents a compound or group containing at least 3 carboxylate ester groups, achieves an extraordinarily good compatibility in the various lacquer and molding composition resins.

The amount of polysiloxane added to the lacquers and molding compositions is, in accordance with the state of the art, so large that the desired effect with regard to a sufficient anti-adhesive character and increase of the lubricity is achieved. Very small amounts may be sufficient to achieve a notable effect, for example 0.05 weight percent with respect to the total weight of the lacquer or molding composition. Preferably the quantity of polysiloxane amounts to at least about 0.1 weight percent, particularly preferably at least about 0.5 weight percent, with respect to the total weight of the lacquer or molding composition. The upper limit for the polysiloxane content is determined by achievement of a sufficient effect and by the desire to keep the quantity as small as possible, since the polysiloxanes are relatively high value, expensive products, so that for cost reasons an excessive addition as a rule is avoided. The upper limit generally lies at about 5 weight percent, preferably at about 3 weight percent, and particularly preferably at about 2 weight percent, with respect to the total weight of the lacquer or molding composition.

The group R constitutes a significant component part of the polysiloxane utilized according to the invention. This is a carboxylate ester group containing at least three

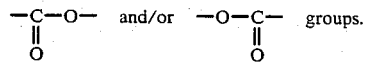

These groups are preferably connected to each other by bifunctional hydrocarbon groups having 2 to 12, preferably 4 to 6, carbon atoms. Saturated aliphatic hydrocarbon groups having 5 carbon atoms are particularly preferred. The group R is preferably a polycaprolactone group, which accordingly is formed by polymerization of caprolactone, as described in detail hereinafter.

Preferably A and B each represent a group —Z—R—Q, and D represents —CH$_3$; these are so-called linear siloxanes. It is further preferred thereby that the ratio of the number of groups —Z—R—Q to the number x lie in the range from 1:3 to 1:25, preferably from 1:5 to 1:15.

Another preferred embodiment is that A and B each represent the group —CH$_3$ and D represents —Z—R—Q. In this case, it is further preferred that the ratio of the number of groups —Z—R—Q to the number x lie in the range from 1:3 to 1:25, preferably from 1:4 to 1:16.

The polysiloxanes utilized in accordance with the invention which contain carboxylate ester groups can be produced by reacting functional siloxanes, as illustrated, for example, by the following Formulas II through VIII, according to the subsequently described reaction mechanisms.

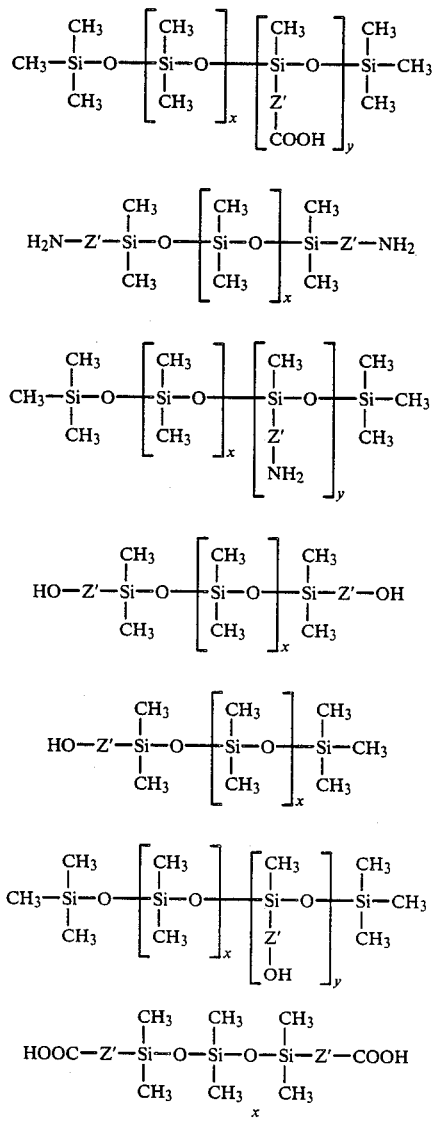

VI

VII

VIII

II

III

IV

V whereby:
x represents a number from 3 to 150,
y represents a number from 1 to 6, and
Z' represents a bi-functional group which connects a Si-atom to an —OH, —COOH or —NH₂ group.

These functional polysiloxanes are in part commercially available or they can be easily produced according to known processes as described, for example, in German Patent No. 1,236,505; and U.S. Pat. Nos. 3,960,574; 4,076,695; 3,481,969; 3,442,925; 3,567,499; and 2,947,771, the disclosures of which are hereby incorporated herein by reference.

The determination of the equivalent weight of the siloxane starting material which is necessary for further reaction to produce the ester group containing polysiloxanes according to the invention can be achieved by determining the hydroxyl number, acid number or amine number.

The reaction of OH-functional polysiloxanes corresponding to Formulas II, III or IV with lactones, such as beta-propiolactone, delta-valerolactone, epsiloncaprolactone and dodecalactone or substituted derivatives thereof, takes place by a ring-opening esterification process. Examples of polymerizable lactones and of processes for their polymerization are found in U.S. Pat. No. 4,360,643, the disclosure of which is incorporated herein by reference.

The OH- groups required to commence the ringopening polymerization are provided by the OH-functional polysiloxane, and the chain length of the polyester is determined by the molar amount of lactone which is utilized per hydroxyl group. The lactone polymerization is initiated in accordance with known procedures by, for example, p-toluenesulfonic acid or dibutyltin dilaurate at temperatures from about 100° C. to 180° C. carried out either in suitable solvents, such as high-boiling gasoline fractions, alkylbenzenes, esters or ketones, or directly in a melt, and proceeds, for example, according to the following reaction mechanism:

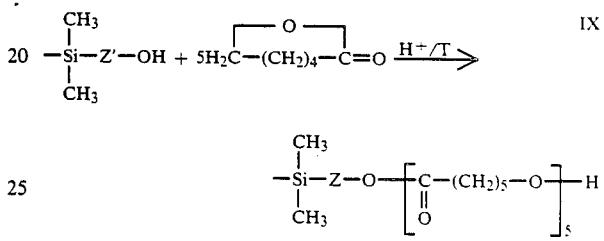

IX

In this way hydroxy terminated polyester group containing polysiloxanes are obtained so that in this case Q represents OH. Such polyesters formed from lactones advantageously have an average molecular weight $\overline{Mn}$ from about 300 to 3,000, preferably from about 500 to 1,500.

If, however, Q represents a COOH functional group, then the aforedescribed reaction is carried further in accordance with processes which are suited for forming free carboxylic acid groups, as is possible, for example, by ringopening esterification with dicarboxylic acid anhydrides or tricarboxylic acid anhydrides. This reaction takes place, for example, according to the following reaction scheme:

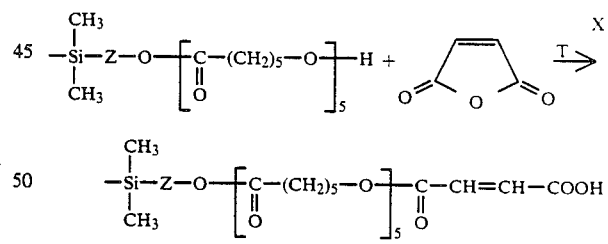

X

Suitable dicarboxylic acid anhydrides or tricarboxylic acid anhydrides include, for example, maleic acid anhydride, succinic acid anhydride, phthalic acid anhydride, tetrahydrophthalic acid anhydride, hexahydrophthalic acid anhydride and 1,2,4-benzenetricarboxylic acid anhydride.

If Q is to be an —NCO group, then the example reactions described under IX or XV are carried further in that the hydroxy-functional polyester is reacted with polyisocyanates, preferably diisocyanates, in such a proportion of polyisocyanate to OH groups that preferably only one isocyanate group of the polyisocyanate is reacted. This can be achieved, for example, by utilizing polyisocyanates with isocyanate groups having differing reactivities. Such isocyanates include, for example, isophoronediisocyanate (3-isocyanatomethyl-3,5,5-trimethylcyclohexylisocyanate). In this diisocyanate, the isocyanate group connected to the cycloaliphatic group is less reactive than the —NCO group connected to the aliphatic group by a factor of 10.

In addition, the course of the reaction can be guided to formation of mono adduct by utilizing the polyisocyanate in greater molar amounts in comparison to the available OH groups than are necessary for formation of the mono adduct. The excess polyisocyanate can be removed by vacuum distillation, preferably with a thin-layer evaporator.

The described reaction takes place, for example, according to the following reaction scheme:

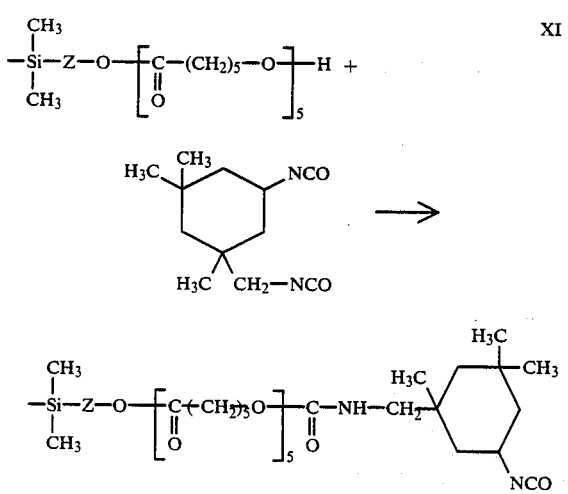

If Q is to be a —CH=CH₂ group, the example reactions described under IX or XV are carried further by reacting the hydroxy-functional polyester with, for example, acrylic acid chloride or methacrylic acid chloride. This may advantageously be carried out in a medium in which the hydrogen chloride which is released is captured in salt form, for example in pyridine.

The described reaction takes place, for example, according to the following reaction scheme:

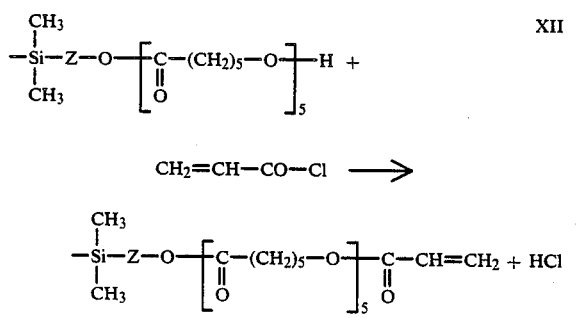

The salt formation with carboxy-functional polysiloxanes takes place in the known manner by reacting the siloxanes with, for example, alkali carbonates or alkali hydrogen carbonates with release of $CO_2$ and $H_2O$. The resulting water can be removed under mild conditions azeotropically with, for example, toluene or under vacuum. The reaction takes place, for example, according to the following reaction scheme:

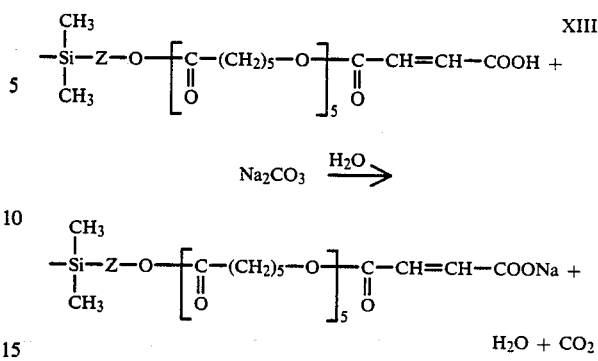

Suitable cations for salt formation include lithium, sodium and potassium.

Amine salts of the carboxy-functional polysiloxanes according to the invention are especially suitable for forming anti-adhesive layers in polyurethane molding compositions. Particularly suitable amines for the salt forming reaction are those which also are conventionally utilized in such polyurethane systems as catalysts. Accordingly, amines such as, for example, triethylenediamine (known as DABCO ®), benzyldimethylamine, triethylamine, and/or N-alkylmorpholine are preferably used as cations. When such amines are utilized in the neutralization of the carboxyfunctional polysiloxanes, they either do not influence, or they only insignificantly influence, the overall course of the reaction during the crosslinking of the polyurethane system.

The reaction of —OH, —COOH or —NH₂ functional polysiloxanes with dicarboxylic acids and/or dicarboxylic acid anhydrides and diols takes place in accordance with known condensation processes which are suitable for forming polyesters.

Depending upon the relative molar proportions of dicarboxylic acid and/or dicarboxylic acid anhydride and diols which are utilized, the resulting terminal groups of the polysiloxane produced during the condensation reaction may be controlled with regard to the formation of —COOH or —OH terminal groups. Such a reaction takes place, for example, according to the following reaction scheme:

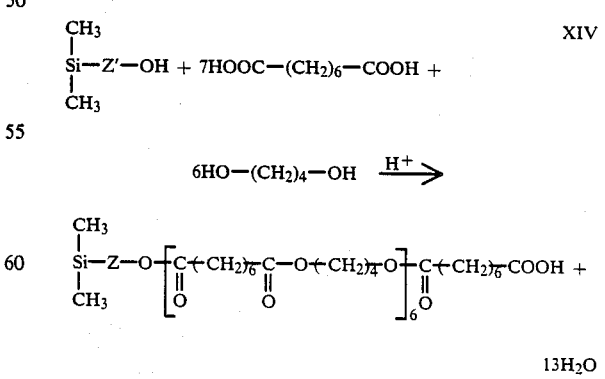

or if amino functional siloxanes are utilized, the reaction may take place according to the following reaction scheme:

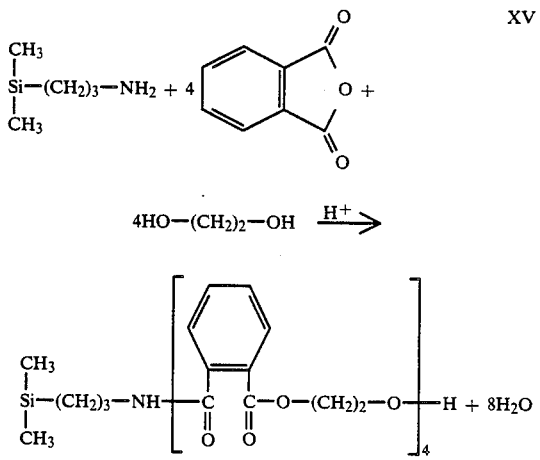

Desirably these polyesters have an average molecular weight $\overline{M}n$ from about 300 to 2,500, preferably from about 500 to 1,500.

By varying the constitution of the polyester, such as by appropriate selection of the diols, dicarboxylic acid anhydrides and/or dicarboxylic acids which are utilized as well as the number of ester groups, a desired degree of compatibility can be achieved with the polymers used as binders for the lacquer or molding composition. This play an important role, particularly with binders having differing polarities. Also, phthalic acid polyester-modified siloxanes are, for example, advantageously utilized for binders based on phthalate esters. Caprolactone polyester-modified siloxanes are particularly preferred because they are highly compatible with the most diverse polymer systems.

From the foregoing explanations, it can be seen that as aliphatic, cycloaliphatic and aromatic polyester groups, use can be made of those which are conventional and known to be advantageous in the production of polyesters in the field of lacquers and molding compositions according to the state of the art. The diols preferably are chosen from the $C_2$ through $C_{12}$ series of compounds, since these are readily available, while the dicarboxylic acids are desirably selected from those having from 2 to 10 carbon atoms in the alkylene chain. The cyclohexane group is preferred as a cycloaliphatic group, and the phenyl group is preferred as an aromatic group.

The group Z serves to connect the silicon atom to the carboxylate ester group R. The nature of this bifunctional connecting group depends on the starting materials used to produce the siloxane according to the invention and on the nature of the reaction, as is known in the field of siloxane chemistry (compare, inter alia, U.S. Pat. No. 3,960,574, Column 1). Examples of suitable bifunctional connecting groups include alkylene groups, preferably having from 2 to 4, 10 or 11 carbon atoms, because corresponding starting materials are especially easy to obtain. The bifunctional group may also be an alkylene group which contains a thioether group (—S—). If one starts with amino group-containing siloxanes, the connecting group will be an alkyleneamide group.

The group Q serves to covalently bond the carboxylate ester group-containing polysiloxane with the lacquer or molding composition. The selection of the group Q which is to be utilized depends on which type of reaction is used to produce the lacquer resin or molding composition resin being used. Desirably, in radical-cured systems, an acrylate, methacrylate, allyl- or maleinate group is preferred. In epoxy resins the hydroxyl group or carboxyl group is recommended. In polyurethanes the hydroxyl group is preferred when the polysiloxane of the invention is to be utilized in the hydroxyl group containing resin portion. However, the isocyanate group is preferred if the polysiloxane according to the invention is to be utilized in the isocyanate containing resin portion. In polyurethane systems which can be made to react very quickly by means of appropriate catalysts, as in the case of the reactive injection molding process (RIM-process or RRIM-process), carboxylate salts of carboxylate ester-containing polysiloxanes are advantageously utilized.

If comb-like siloxanes are utilized, i.e. those in which D represents a group —Z—R—Q, then y is advantageously 4 at the highest, preferably 3 at the highest.

In so-called linear siloxanes, the carboxylate ester groups lie only at the two ends of the siloxane chain. In this case, x represents a number from 6 to 50, preferably from 8 to 32.

A polysiloxane according to the invention produced according to the condensation process is usefully carried out with linear siloxanes since in such a case by carrying out the reaction in a controlled manner a further polycondensation involving incorporation of several polysiloxane segments can be substantially avoided. The uniformity of such products has been established by GPC investigations.

As used herein, the term "average molecular formula" is to be understood as meaning that the material contains molecules corresponding substantially to the structure of the formula. As is known to persons skilled in the art, however, minor side reactions cannot be completely excluded. The requirements of the invention can be considered fulfilled if at least 75% of the desired compound results, and the remainder is present as a homologous series of such compounds or as side products.

If comb-like products in which y is greater than 2 are reacted in such a condensation process, cross-linking reactions occur as is known to persons skilled in the art. Insofar it is advantageous with comb-like polysiloxanes to utilize substantially only those in which y equals 1 to 2 and to carry out the condensation reaction in stages in order to substantially suppress cross-linking reactions.

Consequently, preferred starting siloxanes are —OH functional polysiloxanes, as represented, for example, in Formulas II, III and IV, which are converted by ring-opening esterification with lactones to the polyester group containing polysiloxanes of the invention since side reactions are most effectively suppressed hereby.

Lacquers and Molding Compositions According to the Invention Which Contain at Least One Curable Binder Plus Compounds of Formula I and Optional Solvents or Conventional Additives

EXAMPLE 1

In a reaction vessel provided with a stirrer and a reflux condenser 569 g (0.5 mole) of a polysiloxane having an average formula

a hydroxyl number of 99 mg KOH/g were reacted with 571 g (5.0 moles) epsilon-caprolactone and after addition of 100 ppm dibutyltin dilaurate under nitrogen were heated to 160° C. After a reaction time of 6 hours, an organopolysiloxane was obtained having an average formula

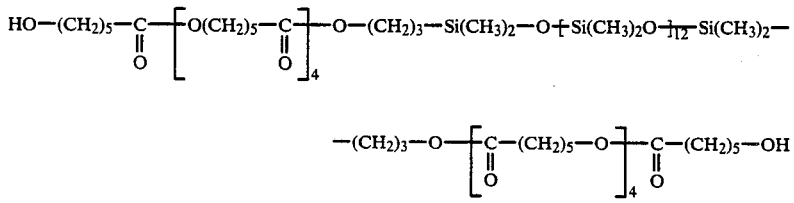

The hydroxyl number amounted to 48 mg KOH/g and the saponification number was 252 mg KOH/g.

EXAMPLE 2

In the same manner as described in Example 1, 393 g (0.5 mole) of a polysiloxane having the average formula HO—CH$_2$—Si(CH$_3$)$_2$—O$+$Si(CH$_3$)$_2$—O$\}_8$Si(CH$_3$)$_2$—CH$_2$—OH and a hydroxyl number of 143 mg KOH/g were reacted with 457 g (4 moles) epsilon-caprolactone to yield an organopolysiloxane having an average formula

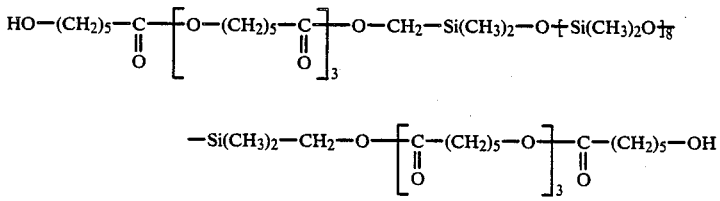

The hydroxyl number amounted to 66 mg KOH/g and the saponification number was 254 mg KOH/g.

EXAMPLE 3

In the same manner as described in Example 1, 488 g (0.25 mole) of a polysiloxane having the average formula

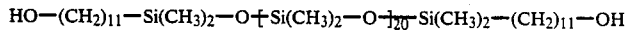

and a hydroxyl number of 57 mg KOH/g were reacted with 856 g (7.5 moles) epsilon-caprolactone to produce an organopoly-siloxane having the average formula

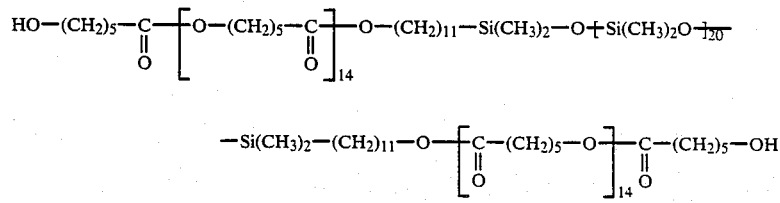

with a hydroxyl number of 20 mg KOH/g and a saponification number of 325 mg KOH/g.

EXAMPLE 4

In the same manner as described in Example 1, 837 g (0.5 mole) of a polysiloxane having the average formula HO—CH$_2$—Si(CH$_3$)$_2$—O$+$Si$+$CH$_3$)$_2$O$\}_{20}$Si(CH$_3$)$_2$—CH$_2$—OH and a hydroxy number of 67 mg KOH/g were reacted with 1001.2 g (10 moles) delta-valerolactone to produce an organopoly-siloxane having the average formula

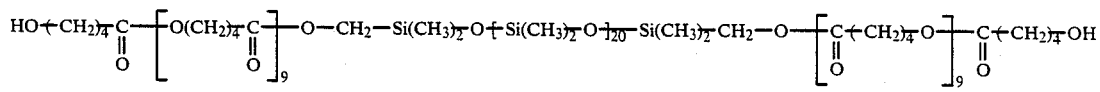

with a solids content of 96.5%, a hydroxyl number of 29 mg KOH/g and a saponification number of 300 mg KOH/g.

EXAMPLE 5

In the same manner as described in Example 1, 902 g (0.33 mole) of a polysiloxane having the average formula

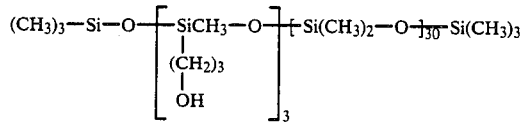

and a hydroxyl number of 62 mg KOH/g were reacted with 912 g (8.0 moles) epsilon-caprolactone to produce an organopoly-siloxane having the average formula

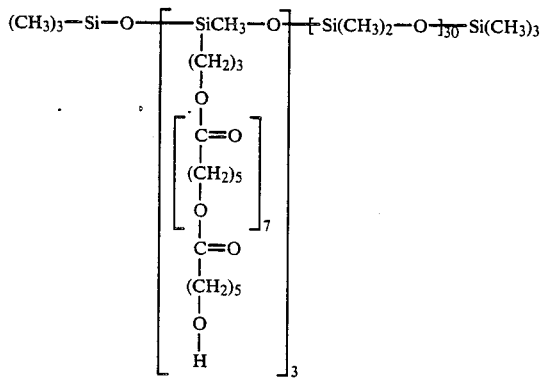

with a hydroxyl number of 31 mg KOH/g and a saponification number of 239 mg KOH/g.

EXAMPLE 6

In the same manner as described in Example 1, 944 g (0.2 mole) of a polysiloxane having an average formula of

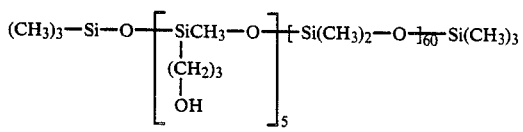

and a hydroxyl number of 59 mg KOH/g were reacted with 1140 g (10 moles) epsilon-caprolactone to produce an organopoly-siloxane having an average formula of

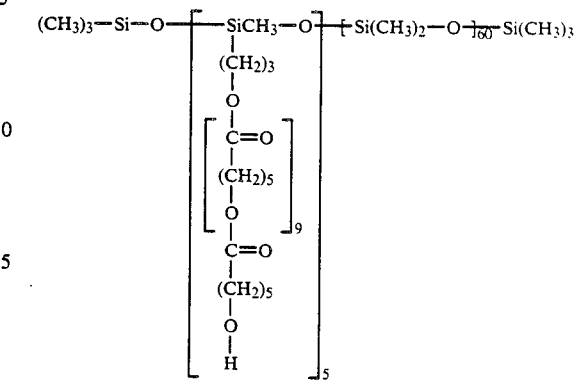

having a hydroxyl number of 25 mg KOH/g and a saponification number of 274 mg KOH/g.

EXAMPLE 7

In a reaction vessel provided with a stirrer and a water separator 717 g (0.5 mole) of a polysiloxane having an average formula of

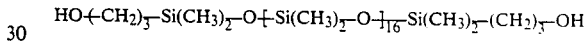

and a hydroxyl number of 78 mg KOH/g were combined with 467 g (3.2 moles) adipic acid, 180 g (2 moles), 1,4-butanediol, and 300 g xylene and after addition of 3 g p-toluenesulfonic acid were heated to 140° C. After a reaction time of 4 hours (H$_2$O yield: 91 g: theoretical H$_2$O yield: 90 g), the xylene and the excess adipic acid were removed under vacuum. The resulting organopolysiloxane having an average formula of

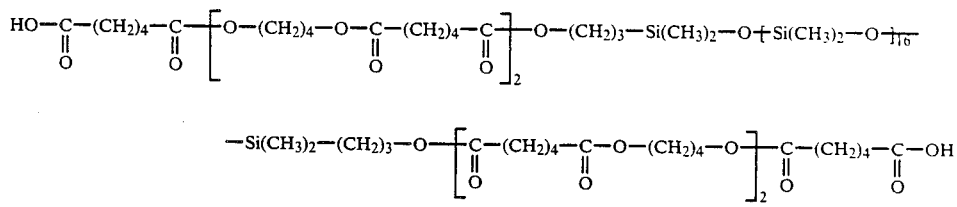

had an acid number of 45 mg KOH/g and a saponification number of 202 mg KOH/g.

EXAMPLE 8

In the same manner as described in Example 7, 499 g (0.25 mole) of a polysiloxane having an average formula of

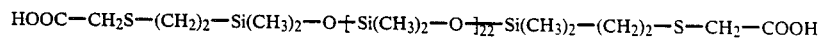

and an acid number of 56 mg KOH/g were reacted with 234 g (2.6 moles) of 1,4-butanediol and 292 g (2.0 moles) adipic acid to produce an organopolysiloxane having the formula

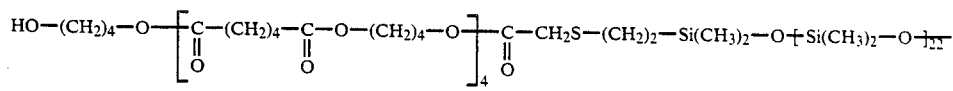

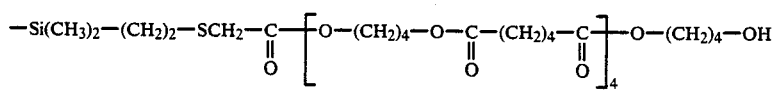

The hydroxyl number of the resulting product amounted to 28 mg KOG/g; saponification number was 237 mg KOH/g.

EXAMPLE 9

In the same manner as described in Example 7, 495 g (0.5 mole) of a polysiloxane having an average formula of

and a hydroxyl number of 113 mg KOH/g were reacted with 311 g (2.1 moles) phthalic acid anhydride and 104 g (1.04 mole), 1,5-pentanediol to produce an organopolysiloxane having an average formula of

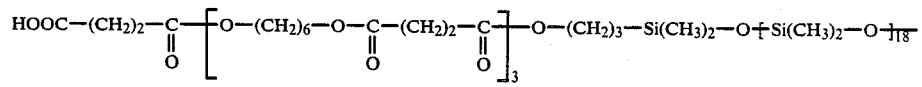

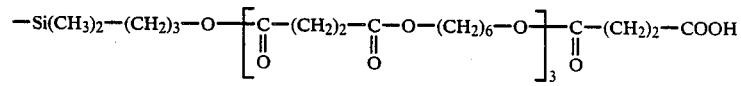

The acid number of the resulting product amounted to 65 mg KOH/g, the saponfication number was 185 mg KOH/g.

EXAMPLE 10

In the same manner as described in Example 7, 791 g (0.5 mole) of a polysiloxane having an average formula of

and a hydroxyl number of 71 mg KOH/g were reacted with 420 g (4.2 moles) succinic acid anhydride and 354 g (3 moles) 1,6-hexanediol to produce a organopolysiloxane having an average formula of

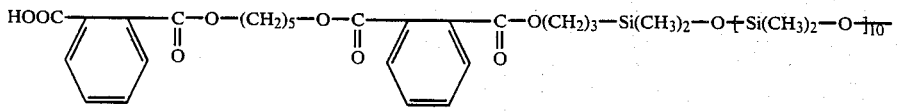

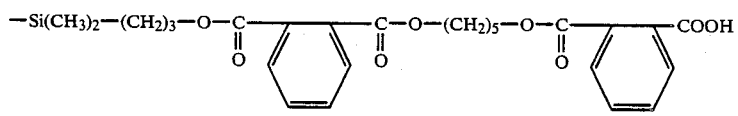

The acid number of the resulting product amounted to 38.5 mg KOH/g; the saponification number amounted to 271 mg KOH/g.

EXAMPLE 11

In the same manner as described in Example 7, 615 g (0.5 mole) of a polysiloxane having an average formula of

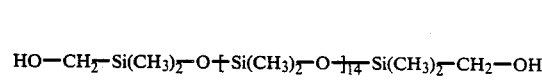

and a hydroxyl number of 91 mg KOH/g were reacted with 444 g (3 moles) phthalic acid anhydride and 333 g (3.2 moles) neopentylglycol to produce an organopolysiloxane having an average formula of

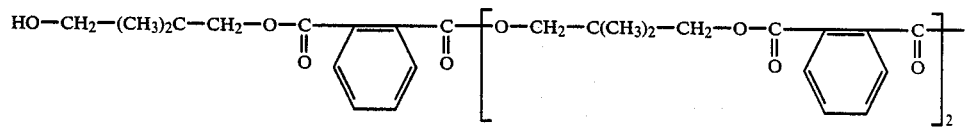

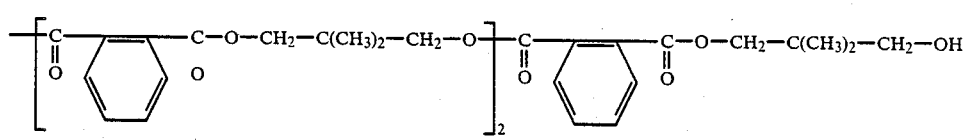

The hydroxyl number of the resulting product amounted to 39 mg KOH/g; the saponification number was 251 mg KOH/g.

EXAMPLE 12

In a reaction vessel provided with a stirrer and water separator, 716 g (0.5 mole) of a polysiloxane having an average formula of

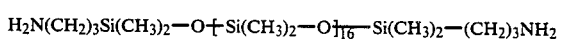

and an amine number of 78 mg KOH/g were heated with 146 g (1 mole) adipic acid to 160° C. while passing nitrogen thereover. After separation of approximately 18 g (1 mole) water and cooling to 95° C., 208 g (2 moles) 1,5-pentanediol and an additional 307 g (2.1 moles) adipic acid were added and the reaction mixture was heated again to 160° C. After a reaction time of 3 hours, approximately 72 g (4 moles) water had separated. After applying a vacuum (20 mbar) the excess adipic acid was removed up to a sump temperature of 180° C. The resulting organopolysiloxane having the average molecular formula

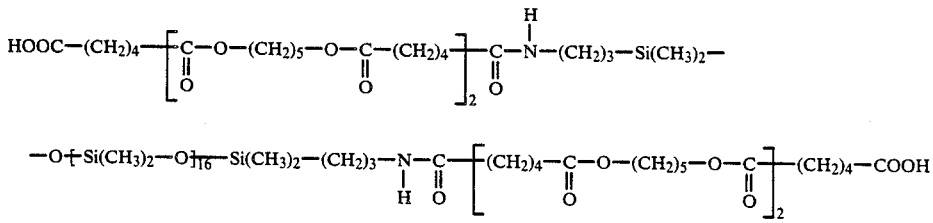

had an acid number of 45 mg KOH/g and a saponification number of 179 mg KOH/g.

EXAMPLE 13

In a reaction vessel provided with a stirrer and a reflux condenser, 584 g (0.25 mole) of an organopolysiloxane synthesized as described in Example 1 were reacted with 49 g (0.5 mole) maleic acid anhydride within a period of 4 hours at a temperature of 160° C. to produce an organopolysiloxane having an average formula of

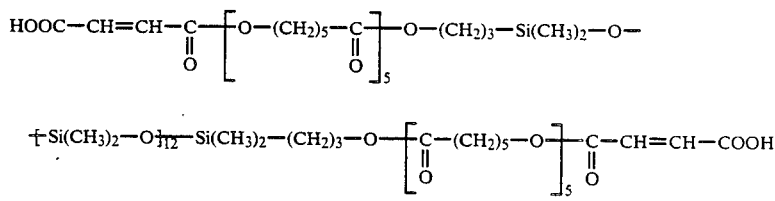

having an acid number of 45 mg KOH/g and a saponification number of 267 mg KOH/g.

EXAMPLE 14

In the same manner as described in Example 13, 1403 g (0.25 mole) of an organopolysiloxane synthesized as described in Example 3 were reacted with 74 g (0.5 mole) phthalic acid anhydride to produce an organopolysiloxane having an average formula of

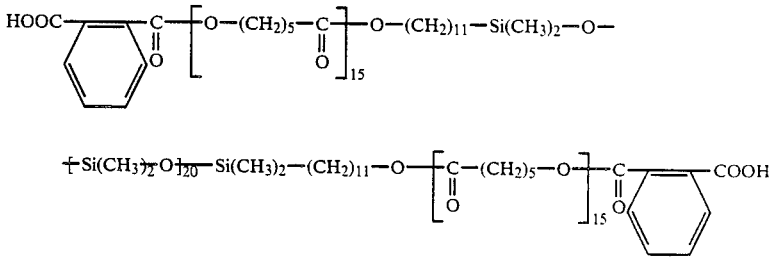

having an acid number of 17 mg KOH/g and a saponification number of 310 mg KOH/g.

EXAMPLE 15

In a reaction vessel provided with a stirrer and a reflux condenser, 863 g (0.5 mole) of an organopolysiloxane synthesized as described in Example 9 were neutralized at room temperature with 336 g of a 25% aqueous NaHCO₃ solution. After addition of 250 g toluene, the water azeotrope was distilled off. After removal of the solvent by distillation, the resulting organopolysiloxane having an average formula of

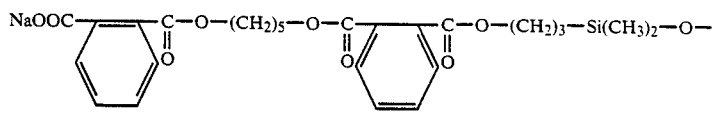

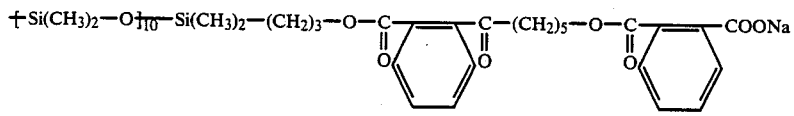

had an acid number of 0.7 mg KOH/g and a saponification number of 180 mg KOH/g.

EXAMPLE 16

In the same manner as described in Example 15, 1246 g (0.5 mole) of an organopolysiloxane synthesized as described in Example 13 were reacted with 400 g of a 25% aqueous KHCO₃ solution to produce an organopolysiloxane having an average formula of

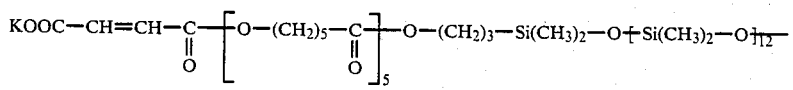

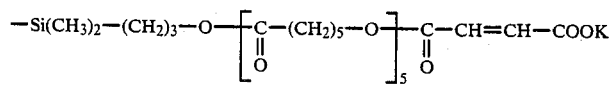

having an acid number of 0.5 mg KOH/g and a saponification number of 264 mg KOH/g.

EXAMPLE 17

In a reaction vessel provided with a stirrer and reflux condenser 1246 g (0.5 mole) of an organopolysiloxane synthesized as described in Example 13 was combined with 300 g toluene and neutralized by addition of 101 g (1.0 mole) triethylamine with stirring. After removal of the solvent, the resulting organopolysiloxane having an average formula of had a saponfication number of 271 mg KOH/g.

EXAMPLE 18

In the same manner as described in Example 17, 1650 g (0.25 mole) of an organopolysiloxane synthesized as described in Example 14 were reacted with 67.5 g (0.5 mole) benzyldimethylamine to produce an organopolysiloxane having an average formula of

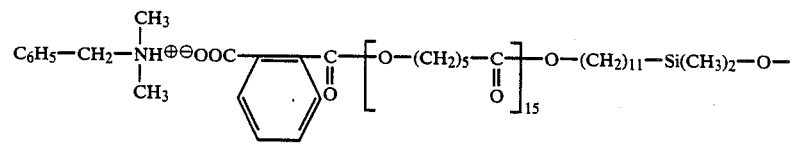

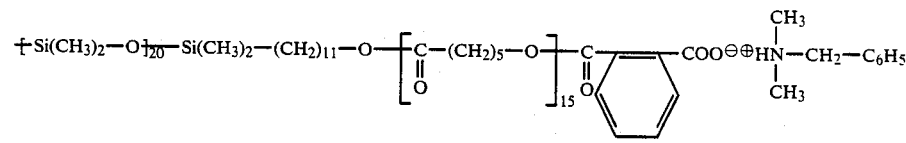

with a saponification number of 315 mg KOH/g.

EXAMPLE 19

Into a reaction vessel provided with a stirrer and reflux condenser 250 g dried toluene and 87 g (0.5 mole) toluene-2,4-diisocyanate were introduced, and 561 g (0.1 mole) of an organopolysiloxane synthesized as described in Example 3 were added dropwise within a period of 60 minutes. After a post-reaction time of 8 hours at ambient temperature, the excess toluene-2,4,-diisocyanate and the toluene were removed under vacuum. The resulting organopolysiloxane having an average formula of

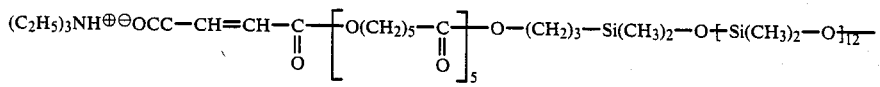

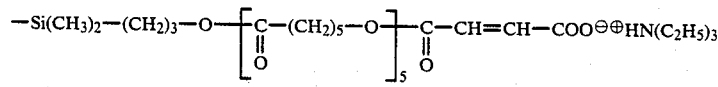

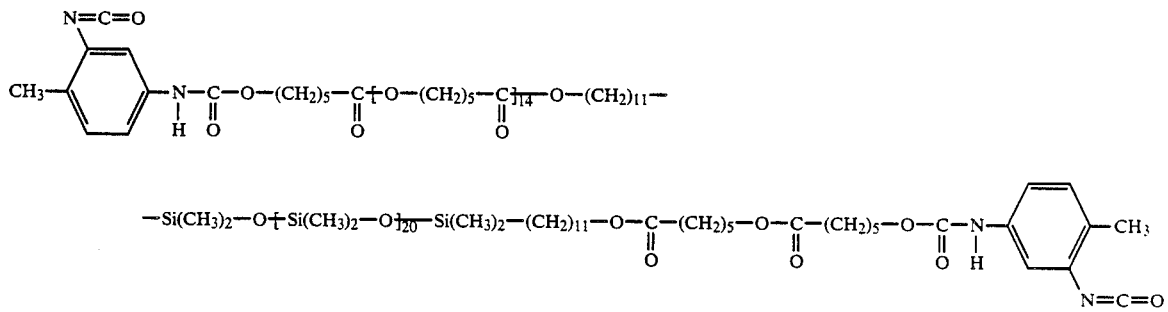

had an NCO-content of 1.5% and a saponification number of 320 mg KOH/g.

EXAMPLE 20

In a reaction vessel provided with a stirrer and reflux condenser 585 g (0.25 mole) of an organopolysiloxane synthesized as described in Example 1 was combined with 198 g (2.5 moles) pyridine, 54.3 g (0.6 mole) acrylic acid chloride and 250 ppm hydroquinone monomethylether and heated to 180° C. After a post-reaction time of 6 hours, the excess acrylic acid chloride was hydrolyzed by addition of water and removed together with the pyridine and the pyridine hydrochloride from the reaction mixture by extraction with water. After drying by means of azeotropic distillation, the resulting organopolysiloxane having an average formula of

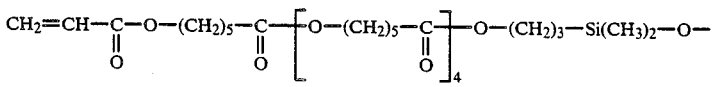

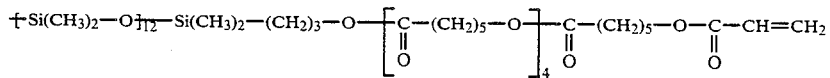

had a saponfication number of 242 mg KOH/g and an iodine number of 20 g iodine/100 g.

The following lacquer vehicles were utilized in tests of the polysiloxane additives of the invention. Unless otherwise indicated, all references to percent refer to weight percent.

| Lacquer A Furniture Lacquer | |
|---|---|
| Fatty acid modified hydroxy polyester (Desmophen ® RD 181 75% solution) | 20% |
| Hydroxypolyester (Desmophen ® 1200) | 5% |
| Cellulose Acetobutyrate (Cellit ® BP 300 10% solution) | 4% |
| Butylacetate | 16.4% |
| Toluene | 12% |
| Ethylacetate | 12% |
| Ethylglycolacetate | 5.6% |
| Hardener (Desmodur ® HL 60) | 25% |
| | 100% |

Curing conditions: 10 minutes at 80° C.

| Lacquer B Acrylic/Melamine Lacquer | |
|---|---|
| Acrylic resin 50% solution (Synthacryl ® SC 303; Hoechst) | 43.4% |
| Melamine resin (Setamine ® US 133; Synthese) | 15.5% |
| Pigment (Sicomin Red ® L 3030 S; BASF) | 25% |
| Bentone ® paste 10% solution | 2.5% |

| -continued | |
|---|---|
| Lacquer B Acrylic/Melamine Lacquer | |
| Xylene | 4.6% |
| Aromatic hydrocarbons, boiling range 165–185° C. | 6% |
| Aromatic hydrocarbons, boiling range 186–215° C. | 3% |
| | 100% |

Curing conditions: 20 minutes at 130° C.

| Lacquer C Coil Coating Lacquer | |
|---|---|
| Oil-free polyester (Uralac ® 107-RA 8; Scado) | 44.55% |
| TiO$_2$ (RN 59; Bayer) | 20.35% |
| Melamine resin (Cymel ® 301; Amer. Cyanamid) | 4.70% |
| p-toluenesulfonic acid, 40% solution in ethylglycolacetate | 0.25% |
| Thinner (diluent) | 30.15% |
| | 100% |

Curing conditions: 60 seconds at 260° C.

| Lacquer D | |
|---|---|
| UV-reactive hydroxyacrylate resin (Plex ® 6617-0) | 57.4% |
| Reactive thinner (Plex ® 6618-0) | 38.3% |
| Photoinitiator (Irgacure ® 651) | 2.9% |
| Benzophenone | 1.4% |
| | 100% |

Curing conditions: UV-hardening at 5 m times min$^{-1}$ with a lamp of 80 W times an$^{-1}$.

| Lacquer E Anti-Graffiti Coating | |
|---|---|
| Hydroxy polyester (Desmophen ® 651 67% solution) | 31.2% |
| Ethylglycolacetate | 5.1% |
| Methoxybutylacetate | 3.4% |
| Reaction accelerator (Desmorapid ® PP 10% solution) | 1.2% |
| Defoamer | 0.2% |
| TiO$_2$ | 31.8% |
| Bentone 10% solution | 2.1% |
| Hardener (Desmodur ® IL 75% solution) | 25% |

| Lacquer E |  |
|---|---|
| Anti-Graffiti Coating |  |
|  | 100% |

Curing conditions: air dried at room temperature.

| Lacquer F |  |
|---|---|
| Release Lacquer |  |
| Fatty acid modified hydroxypolyester (Desmophen ® 1300) | 33.3% |
| Ethylacetate | 35.1% |
| Hardener (Desmodur ® HL 60% solution) | 31.6% |
|  | 100% |

Curing conditions: 60 seconds at 140° C.

Test of Sliding Friction (Lubricity)

An approximately 40 micron thick lacquer layer was applied to test plates 60 by 15 centimeters in size (lacquer A, furniture plate; lacquers B, C and D, aluminum plate) by means of a casting machine (lacquer A), a spray applicator (lacquer B) and a spiral doctor (lacquers C and D). After hardening of the lacquer film, the transparency of the lacquer film was judged in transmitted light (for pigmented lacquers this test was carried out separately with corresponding clear lacquers). After determination of the sliding friction, the lacquered surface was subsequently cleaned with a mixture of solvent naphtha and ethanol, and the sliding friction was again measured by the method described hereinafter.

The polysiloxanes according to the invention listed in Table 1 were added to the lacquers.

As comparative examples, the following commercially available polysiloxanes were added:

Comparative Example 1=low molecular weight polydimethylsiloxane (Baysilon ® M 50)
Comparative Example 2=polyoxyalkylenepolysiloxane copolymer (Byk ® 300)
Comparative Example 3=alpha,omega-hydroxyalkyl-polydimethylsiloxane (Baysilon ® OF/OH 502)

The results are compiled in Table 1.

For measuring the sliding friction an exact measuring method was utilized which has replaced the previously frequently utilized "fingernail test" or the measurement of the angle at which cylindrical bodies slide off the coating, and which is described as follows.

An electric film drawing apparatus having a constant speed or displacement was utilized. A push-pull force transducer was attached to the mounting for the film drawing line. The force transducer trasmitted the resistance encountered by every sliding body through a measurement amplifier to a graph plotter. The sliding body was moved in the push and the pull directions over the surface to be measured. Stone weights or hollow cylinders filled with steel balls which were provided on their sliding surfaces with defined felt underlayers were used as sliding bodies.

CARRYING OUT OF THE MEASUREMENTS

In accordance with the concept of this measuring apparatus, measurements were carried out with varying weights of sliding bodies and at varying speed levels on defined surfaces—matt black synthetic plastic plates as utilized in the abrasion test for emulsion paints. In testing the various additives, glass plates were used as supports for the lacquer films.

Measurement Results

In comparable measurements it was determined that the sliding resistance increased in proportion to the weight of the sliding body. Additionally, it was apparent that the speed at which the measurement body was moved over the surface had no measurable influence on the result, even when increased four-fold. When the measurement points were plotted in a graph, a straight line resulted which passed through the zero point. Repeated measurements on different surfaces always gave the same curve. The angle of the curve corresponded to the sliding properties (frictional character) of the surface. This proves that the measurement method leads to reliably reproducible results. In practice, this means an exact and rapid measurement of sliding properties expressed by objective numerical values. The sliding resistance is indicated in Newtons (N).

Test Method for Anti-Graffitti Coating

An approximately 80 micron thick lacquer layer was applied by spraying to an asbestos cement plate 50 by 50 centimeters in size which had been pretreated with a primer. The lacquer contained the additive materials indicated in Table 2. After complete hardening of the lacquer film (requiring approximately 7 days), various commercially available spray paints were applied and the following tests carried out:

1. Visual Determination of the Behavior of the Anti-Graffitti Coating
2. Visual Determination of the Undercoat Wetting by the Applied Spray Paint
   (1)=spray paint spreads well on the anti-graffiti coating.
   (2)=spray paint tends slightly to collect in drops on the anti-graffit coating.
   (3)=spray paint collects in drops on the anti-graffiti coating.
3. Adhesion of the spray paint to the anti-graffiti coating.
   (1) After removing the applied spray paint five times by means of ethylglycol acetate, tests 2 and 3 were repeated. The results are shown in Table 2.

Test Method for an Internal Release Agent

In order to test the separating effect, 320 g of the PUR-RIM formulation was introduced into a 30 cm by 30 cm by 0.3 cm aluminum mold laid out with a 0.1 millimeter thick aluminum foil and heated to 50° C. After a reaction time of 5 minutes, the test plate was removed, and the adhering aluminum foil was cut into 2.5 cm wide strips. The aluminum strips were peeled off at an angle of 180° to the surface of the polyurethane test plate at a speed of 30 centimeters per minute. The force required for this peeling operation was measured (peel adhesion). Further, the starting time of the reaction (the time interval following addition of the isocyanate until the onset of foaming) and the compatibility (solubility) of the polysiloxane which was utilized in the polyol components were tested.

The following materials were utilized as comparative examples:

Comparative Material 1: Example 1 of U.S. Pat. No. 4,076,695;
Comparative Substance 2: Example 2 of European Patent No. 103,367;

Comparative Substance 3: Example 1 of European Patent No. 116,966 (Test 1).

Table 3 lists the nature and amount of each of the test substances used and the results obtained.

| PUR-RIM Formulation | |
|---|---|
| Polyol (Wyandotte Pluracol ® 380) | 44.34% |
| 1,4-Butanediol | 8.86% |
| Water | 0.07% |
| DABCO ® | 0.22% |
| Dibutyltin dilaurate | 0.01% |
| Isocyanate (Upjohn Isonate ® 181) | 46.5% |
| | 100% |

Release Lacquer Test Method

The release lacquer was applied in an amount of approximately 8 g/m$^2$ to Pergamin paper (60 g/m$^2$) with a 15 micron doctor and cured to a non-tacky coating for 60 seconds in a paint drying oven at 140° C. The following tests were then carried out:

1. Separation Value at 20° C. and 70° C.
2. Residual Adhesive Force.

1. Determination of the Release Value

A self-sticking adhesive tape having a width of 3 cm was applied to the paper coated with the release lacquer and stored under a weight load of 20 g/cm$^2$ for 24 hours at 20° C. or at 70° C. After cooling to 20° C., the adhesive tape was peeled off at an angle of 180° and at a speed of 60 centimeters per minute. The force required for this peeling off was measured.

2. Determination of Residual Adhesive Force

The peeled-off adhesive strips of the release value were applied to a clean glass plate and weighted down with 20 g/cm$^2$ weight for 24 hours. Subsequently, the adhesive strips were peeled off as described in the release value test. As a base value, an adhesive strip which had not been pressed against coated paper was applied to glass, and the test value for this strip was assigned the value 100%. The results are compiled in Table 4.

TABLE 1

| | Amount of Active Substance Used (%) | Resin Compatibility | | | | Sliding Resistance (N) | | | | Sliding Resistance (N) After Washing | | | |
|---|---|---|---|---|---|---|---|---|---|---|---|---|---|
| | | Lacquer A | Lacquer B | Lacquer C | Lacquer D | Lacquer A | Lacquer B | Lacquer C | Lacquer D | Lacquer A | Lacquer B | Lacquer C | Lacquer D |
| Blank Test | — | positive | positive | positive | positive | 2.65 | 2.94 | 2.80 | 2.75 | 2.60 | 3.00 | 2.85 | 2.80 |
| Comparative Example 1 | 0.5 | negative | negative | negative | negative | 1.40 | 1.62 | 1.20 | 1.70 | 2.55 | 2.80 | 2.70 | 2.85 |
| Comparative Example 2 | 0.5 | positive | positive | positive | positive | 1.08 | 1.18 | 0.81 | 0.95 | 2.60 | 2.85 | 2.65 | 2.75 |
| Comparative Example 3 | 0.5 | negative | negative | negative | negative | 0.98 | 1.20 | 1.02 | 1.20 | 1.05 | 1.40 | 1.35 | 2.55 |
| Example 1 | 0.5 | positive | positive | positive | — | 0.80 | 0.83 | 0.50 | — | 0.85 | 0.89 | 0.56 | — |
| Example 2 | 0.5 | positive | positive | positive | — | 0.75 | 0.87 | 0.55 | — | 0.77 | 0.92 | 0.59 | — |
| Example 3 | 0.5 | positive | positive | positive | — | 0.82 | 0.94 | 0.57 | — | 0.86 | 0.99 | 0.63 | — |
| Example 4 | 0.5 | positive | positive | positive | — | 0.91 | 0.73 | 0.63 | — | 0.99 | 0.85 | 0.70 | — |
| Example 5 | 0.5 | positive | positive | positive | — | 0.93 | 0.92 | 0.59 | — | 1.01 | 0.98 | 0.64 | — |
| Example 6 | 0.5 | positive | positive | positive | — | 0.86 | 0.91 | 0.61 | — | 0.98 | 0.98 | 0.69 | — |
| Example 7 | 0.5 | | positive | positive | — | | 0.96 | 0.70 | — | | 1.01 | 0.78 | — |
| Example 8 | 0.5 | positive | positive | positive | — | 0.80 | 0.89 | 0.75 | — | 0.87 | 0.94 | 0.79 | — |
| Example 9 | 0.5 | | positive | positive | — | | 0.84 | 0.68 | — | | 0.92 | 0.73 | — |
| Example 10 | 0.5 | | positive | positive | — | | 0.79 | 0.62 | — | | 0.90 | 0.71 | — |
| Example 11 | 0.5 | positive | positive | positive | — | 0.95 | 0.95 | 0.70 | — | 1.06 | 1.03 | 0.79 | — |
| Example 12 | 0.5 | | positive | positive | — | | 0.86 | 0.63 | — | | 1.00 | 0.69 | — |
| Example 13 | 0.5 | | positive | positive | — | | 0.79 | 0.62 | — | | 0.90 | 0.68 | — |
| Example 14 | 0.5 | | positive | positive | — | | 0.84 | 0.67 | — | | 0.98 | 0.74 | — |
| Example 19 | 0.5 | positive | — | — | positive | 0.98 | — | — | — | 1.10 | — | — | — |
| Example 20 | 0.5 | — | — | — | positive | — | — | — | 0.92 | — | — | — | 1.25 |

TABLE 2

| | Amount of Active Substance Used (%) | Levelling | Substrate Wetting by Spray Paint (Evaluation) | Spray Paint Adhesion | Substrate Wetting After 5 Washings With Ethylglycolacetate | Adhesion After 5 Washings With Ethylglycolacetate |
|---|---|---|---|---|---|---|
| Blank Test | — | poor | 1 | very good | 1+ | very good |
| Comparative Example 1 | 1.0 | poor | 2 | good | 1 | very good |
| Comparative Example 2 | 1.0 | good | 1 | good | 1 | very good |
| Comparative Example 3 | 1.0 | poor | 3 | none | 3 | none |
| Example 1 | 1.0 | good | 3 | none | 3 | none |
| Example 2 | 1.0 | good | 3 | none | 3 | none |
| Example 4 | 1.0 | good | 3 | none | 3 | none |
| Example 5 | 1.0 | good | 3 | none | 3 | none |
| Example 6 | 1.0 | good | 3 | none | 3 | none |
| Example 8 | 1.0 | good | 3 | none | 3 | none |
| Example 11 | 1.0 | good | 3 | none | 3 | none |
| Example 19 | 1.0 | good | 3 | none | 3 | none |

TABLE 3

| | Amount of Active Substance Used (%) | Starting Time (sec.) | Polyol Compatibility | Adhesion (g/cm) |
|---|---|---|---|---|
| Blank Test | — | 25 | | 1220 |
| Comparative Example 1 | 1.5 | 115 | incompatible | 226 |
| Comparative Example 2 | 1.5 | 26 | incompatible | 480 |
| Comparative Example 3 | 1.5 | 27 | incompatible | 395 |
| Example 15 | 1.5 | 27 | compatible | 240 |
| Example 16 | 1.5 | 24 | compatible | 254 |
| Example 17 | 1.5 | 25 | compatible | 210 |
| Example 18 | 1.5 | 26 | compatible | 230 |

TABLE 4

| Example | Amount of Active Substance Used (%) | Release Value 20° C. (g/cm) | Release Value 70° C. (g/cm) | Residual Adhesive Force 20° C. (%) | Residual Adhesive Force 70° C. (%) |
|---|---|---|---|---|---|
| Blank Test | — | 180 | 210 | 96 | 91 |
| No. 3 | 3.0% | 28 | 35 | 100 | 85 |
| No. 6 | 3.0% | 26 | 34 | 95 | 88 |
| No. 8 | 3.0% | 29 | 36 | 98 | 87 |

The foregoing description and examples have been set forth merely to illustrate the invention and are not intended to be limiting. Since modifications of the described embodiments which still incorporate the spirit and substance of the invention may occur to persons skilled in the art, the scope of the invention should be limited solely with respect to the appended claims and equivalents.

We claim:

1. A lacquer or molding composition comprising at least one resin component and an effective anti-adhesive chaacteristic producing and lubricity increasing amount of a polyester-containing polysiloxane corresponding to the average formula

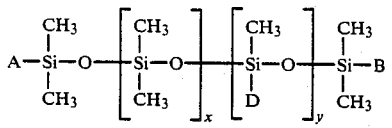

wherein

A, B and D each represent —CH$_3$ or a group —Z—R—Q, in which

Z represents an alkylene group having from 1 to 11 carbon atoms, —(CH$_2$)$_2$SCH$_2$— or —(CH$_2$)$_3$NHCO—;

R represents an aliphatic, cycloaliphatic or aromatic group containing at least 3 carboxylate ester linkages and having an average molecualr weight Mn of from 300 to 3,000, and Q represents an unsaturated reactive group capable of reacting chemically with a resin component of the composition;

x is a number from 4 to 150;

y is a number from 1 to 6, and wherein an average molecular contains at least one —Z—R—Q group, and the ratio of the number of groups —Z—R—Q to the number x is from 1:3 to 1:30.

2. A composition according to claim 1, wherein the carboxylate ester linkages in the group R are connected by bifunctional hydrocarbon groups containing from 2 to 12 carbon atoms.

3. A composition according to claim 2, wherein the carboxylate ester linkages in the group R are connected by bifunctional hydrocarbon groups having from 4 to 6 carbon atoms.

4. A composition according to claim 3, wherein the carboxylate ester linkages in the group R are connected by a saturated aliphatic hydrocarbon group containing 5 carbon atoms.

5. A composition according to claim 1, wherein R represents a polycaprolactone group.

6. A composition according to claim 1, wherein A and B each represent a —Z—R—Q group, and D represents a —CH$_3$ group.

7. A composition according to claim 6, wherein the ratio of the number of —Z—R—Q groups to the number x is from 1:3 to 1:25.

8. A composition according to claim 7, wherein the ratio of the number of —Z—R—Q groups to the number x is from 1:5 to 1:15.

9. A lacquer or molding composition comprising at least one resin component and an effective anti-adhesive characteristic producing and lubricity increasing amount of a polyester-containing branched polysiloxane corresponding to the average formula

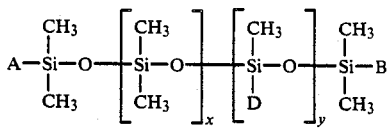

wherein

A and B each represent —CH$_3$ groups,

D represents a group —Z—R—Q, in which

Z represents an alkylene group having from 1 to 11 carbon atoms, —(CH$_2$)$_2$SCH$_2$— or —(CH$_2$)$_3$NHCO—;

R represents an aliphatic, cycloaliphatic or aromatic group containing at least 3 carboxylate ester linkages and having an average molecular weight Mn of from 300 to 3,000, and Q represents a reactive group capable of reacting chemically with a resin component of the composition;

x is a number from 4 to 150;

y is a number from 1 to 6, and
wherein an average molecule contains at leat one —Z—R—Q group, and the ratio of the number of groups —Z—R—Q to the number x is from 1:3 to 1:30.

10. A composition according to claim 9, wherein the ratio of the number of —Z—R—Q groups to the number x is from 1:3 to 1:25.

11. A composition according to claim 10, wherein the ratio of the number of —Z—R—Q groups to the number x is from 1:4 to 1:16.

12. A composition according to claim 9, wherein, Q represents a group selected from the group consisting of

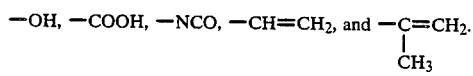

13. A process for imparting anti-adhesive characteristics and improving the lubricity of a composition selected from the group consisting of lacquers and molding compositions, said composition comprising at least one resin component, said process comprising the step of incorporating into the composition an effective anti-adhesive character imparting and lubricity improving amount of a polyester group containing polysiloxane corresponding to the average formula:

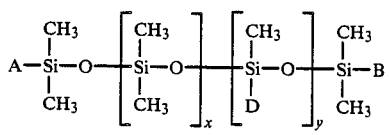

wherein
A, B and D each represent —$CH_3$ or a group —Z—R—Q,
Z represents an alkylene group having 1 to 11 carbon atoms, —$(CH_2)_2SCH_2$—, or —$(CH_2)_3NHCO$—,
R represents an aliphatic, cycloaliphatic or aromatic group containing at least 3 carboxylate ester linkages and having an average molecular weight Mn of 300 to 3,000,
Q represents an unsaturated reactive group capable of chemically reacting with a resin component of the composition,
x is a number from 4 to 150,
y is a number from 1 to 6, and
wherein an average molecule contains at least one group —Z—R—Q, and the ratio of the number of —Z—R—Q groups to the number x is from 1:3 to 1:30.

14. A process for imparting anti-adhesive characteristics and improving the lubricity of a composition selected from the group consisting of lacquers and molding compositions, said composition comprising at least one resin component, said process comprising the step of incorporating into the composition an effective anti-adhesive character imparting and lubricity improving amount of a polyester group containing branched polysiloxane corresponding to the average formula:

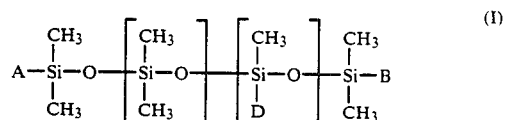

wherein
A and B each represent a —$CH_3$ group,
D represents a group —Z—R—Q,
Z represents an alkylene group having 1 to 11 carbon atoms, —$(CH_2)_2SCH_2$—, or —$(CH_2)_3NHCO$—,
R represents an aliphatic, cycloaliphatic or aromatic group containing at least 3 carboxylate ester linkages and having an average molecular weight Mn of 300 to 3,000,
Q represents a reactive group capable of chemically reacting with a resin component of the composition,
x is a number from 4 to 150,
y is a number from 1 to 6, and
wherein an average molecule contains at least one group —Z—R—Q, and the ratio of the number of —Z—R—Q groups to the number x is from 1:3 to 1:30.

15. A composition according to claim 1, wherein said unsaturated reactive group is selected from the group consisting of acrylate, methacrylate, allyl and maleinate.

16. A method according to claim 13, wherein said unsaturated reactive group is selected from the group consisting of acrylate, methacrylate, allyl and maleinate.

17. A composition according to claim 9, wherein y is 4 at the highest.

18. A composition according to claim 17, wherein y is 3 at the highest.

19. A composition according to claim 9, wherein the carboxylate ester linkages in the group R are connected by bifunctional hydrocarbon groups containing from 2 to 12 carbon atoms.

20. A composition according to claim 19, wherein the carboxylate ester linkages in the group R are connected by bifunctional hydrocarbon groups having from 4 to 6 carbon atoms.

21. A composition according to claim 1, wherein said polyester group containing polysiloxane comprises less than 5 weight percent of said composition.

22. A composition according to claim 9, wherein said polyester group containing polysiloxane comprises less than 5 weight percent of said composition.

* * * * *